United States Patent
Rampton et al.

(10) Patent No.: US 9,254,717 B2
(45) Date of Patent: Feb. 9, 2016

(54) MOTORCYCLE TIRE HAVING A HYBRID CONSTRUCTION

(71) Applicant: The Goodyear Tire & Rubber Company, Akron, OH (US)

(72) Inventors: Neill Rampton, East Aurora, NY (US); Thomas Wood Whitney, Grand Island, NY (US); Carolyn Marie Manning, Lockport, NY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/656,775

(22) Filed: Oct. 22, 2012

(65) Prior Publication Data

US 2014/0110033 A1   Apr. 24, 2014

(51) Int. Cl.
*B60C 3/04* (2006.01)
*B60C 11/00* (2006.01)
*B60C 9/22* (2006.01)
*B60C 9/20* (2006.01)
*B60C 9/06* (2006.01)
*B60C 9/00* (2006.01)

(52) U.S. Cl.
CPC ... *B60C 9/06* (2013.01); *B60C 3/04* (2013.01); *B60C 9/005* (2013.04); *B60C 9/22* (2013.01); *B60C 9/2204* (2013.04); *B60C 11/0083* (2013.04); *B60C 2009/0466* (2013.04); *B60C 2009/0475* (2013.04); *B60C 2009/2214* (2013.04); *B60C 2009/2247* (2013.04); *B60C 2009/2285* (2013.04); *B60C 2011/0016* (2013.04); *B60C 2200/10* (2013.04); *Y10T 152/10855* (2015.01); *Y10T 152/10873* (2015.01)

(58) Field of Classification Search
CPC ........ B60C 9/22; B60C 9/2204; B60C 9/005; B60C 9/06; B60C 9/2003; B60C 11/0083; B60C 3/00; B60C 2009/2214; B60C 2009/2285; B60C 2009/0466; B60C 2009/0475; B60C 2009/2096; B60C 2011/0016; B60C 2200/10; B60C 3/04; Y10T 150/10873; Y10T 152/10783
USPC ............ 152/209.11, 451, 454, 527, 531, 533, 152/556, 557, 559
See application file for complete search history.

(56) References Cited

U.S. PATENT DOCUMENTS 3,776,293 A * 12/1973 Marzocchi .................... 152/557
3,807,476 A *  4/1974 Mills .............................. 152/454

(Continued)

FOREIGN PATENT DOCUMENTS

EP   0 335 588 A2 * 10/1989
EP   0 467 585 A1 *  1/1992

*Primary Examiner* — Adrienne C Johnstone
(74) *Attorney, Agent, or Firm* — Robert N. Lipcsik

(57) ABSTRACT

A pneumatic tire includes a tread, two circumferentially extending annular bead regions, a carcass structure, and an overlay ply. The tread is rotatable about an axis and contacts a road surface. The tread further has an equatorial plane intersecting the axis at 90°. The carcass structure extends between the tread and the bead regions. The carcass structure supports the tread about the axis. The carcass structure includes two or more carcass plies having reinforcing cords oriented to cross at opposite angles of 20° to 65° with respect to the equatorial plane. The overlay ply extends circumferentially and extends radially between the carcass structure and the tread. The overlay ply includes cords oriented between −5° and +5° relative to the equatorial plane.

8 Claims, 1 Drawing Sheet

(56) References Cited

U.S. PATENT DOCUMENTS

| | | | |
|---|---|---|---|
| 4,706,724 A * | 11/1987 | Ohkuni et al. | 152/454 |
| 4,773,462 A * | 9/1988 | Ohkuni et al. | 152/531 X |
| 5,558,144 A * | 9/1996 | Nakayasu et al. | 152/527 |
| 6,988,520 B2 | 1/2006 | Watkins et al. | |
| 7,201,198 B2 * | 4/2007 | Ochiai | 152/531 |
| 7,204,285 B2 * | 4/2007 | Idei | 152/531 |
| 7,213,627 B2 * | 5/2007 | Matsunami | |
| 2011/0132509 A1 | 6/2011 | Kasai | |
| 2011/0155292 A1 | 6/2011 | Nakagawa | |
| 2011/0214792 A1 | 9/2011 | Katayama | |

* cited by examiner

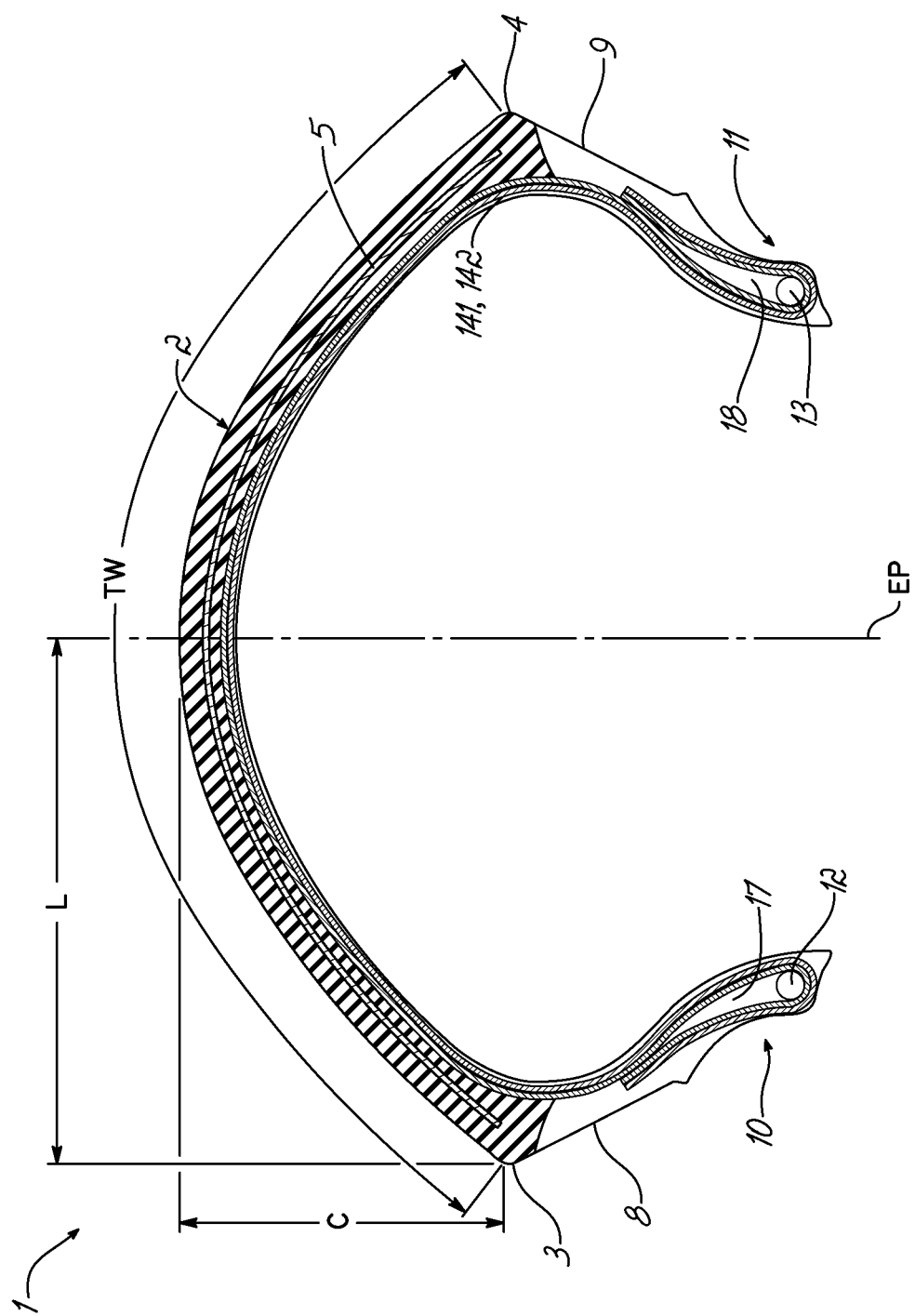

MOTORCYCLE TIRE HAVING A HYBRID CONSTRUCTION

FIELD OF THE INVENTION

This present invention relates to a pneumatic tire and, in particular, to a motorcycle tire with a hybrid construction.

BACKGROUND OF THE PRESENT INVENTION

Conventional motorcycle tires utilize very wide treads which in transverse cross-section are sharply curved to provide good contact with the road surface when the motorcycle is steeply banked in cornering. Maintaining a consistent ground contact area or 'tire footprint' under all conditions is a major challenge in determining general vehicle handling.

Conventional radial motorcycle race tires have short sidewalls which extend to the tread edges radially and axially outwardly from the tires beads. The beads provide engagement to the wheelrim on tapered bead seats. The sidewalls are reinforced by radial carcass plies which, when tensioned by inflation pressure, act together with sidewall geometry to locate the curved tread regions to withstand cornering forces.

The sharply curved tread region of a motorcycle tire may be reinforced by a breaker to give the required structural rigidity and to allow for banking over of the motorcycle when cornering while still allowing sufficient flexibility for localized tread flattening in the ground contact patch for road grip. A conventional tread may further have three separate compound zones, each of which has full tread thickness.

It therefore an object of the present invention is to improve the properties of such motorcycle tires.

SUMMARY OF THE PRESENT INVENTION

A pneumatic tire in accordance with the present invention includes a tread, two circumferentially extending annular bead regions, a carcass structure, and an overlay ply. The tread is rotatable about an axis and contacts a road surface. The tread further has an equatorial plane intersecting the axis at 90°. The carcass structure extends between the tread and the bead regions. The carcass structure supports the tread about the axis. The carcass structure includes two or more carcass plies having reinforcing cords oriented to cross at opposite angles of 20° to 65° with respect to the equatorial plane. The overlay ply extends circumferentially and extends radially between the carcass structure and the tread. The overlay ply includes cords oriented between −5° and +5° relative to the equatorial plane.

According to another aspect of the pneumatic tire, the pneumatic tire includes no belt layer between the overlay layer and the carcass structure.

According to still another aspect of the pneumatic tire, each carcass ply is anchored to each bead region by turning up edges of each ply around a respective bead core at each bead region axially away from the equatorial plane to form four or more ply turn-ups.

According to yet another aspect of the pneumatic tire, the reinforcing cords of the carcass plies comprise polyester and/or nylon.

According to still another aspect of the pneumatic tire, each bead region may include a hard rubber apex member extending taperingly radially outwardly.

According to yet another aspect of the pneumatic tire, the reinforcing cords of the carcass plies include a material selected from polyester, rayon, glass, and aramid.

According to still another aspect of the pneumatic tire, the reinforcing cords of the carcass plies have a 3+2 polyester/glass construction.

According to yet another aspect of the pneumatic tire, the camber value of the pneumatic tire ranges from 0.5 to 0.7 or 0.45 to 0.85.

According to still another aspect of the pneumatic tire, the cords of the overlay ply comprise a material selected from polyester, rayon, glass, and aramid.

According to yet another aspect of the pneumatic tire, the cords of the overlay ply have a 3+1 polyester/aramid construction or an aramid construction.

A pneumatic motorcycle tire includes a tread, two circumferentially extending annular bead regions, a carcass structure, and an overlay layer. The tread is rotatable about an axis and contacts a road surface. The tread further has an equatorial plane intersecting the axis at 90°. The tread has a camber between 0.5 and 0.7 or 0.45 to 0.85. The carcass structure extends between the tread and the bead regions. The carcass structure supports the tread about the axis. The carcass structure includes two or more carcass plies having reinforcing cords oriented to cross at opposite angles of 20° to 65° with respect to the equatorial plane. The overlay layer extends circumferentially and extends radially between the carcass structure and the tread. The overlay layer includes cords oriented between −5° and +5° relative to the equatorial plane.

According to another aspect of the pneumatic motorcycle tire, the tread has a camber of 0.6.

According to still another aspect of the pneumatic motorcycle tire, the reinforcing cords of the carcass plies have a 3+2 polyester/glass construction and the cords of the overlay layer have a 3+1 polyester/aramid construction.

According to yet another aspect of the pneumatic motorcycle tire, the pneumatic motorcycle tire has no belt layer between the overlay layer and the carcass structure.

According to still another aspect of the pneumatic motorcycle tire, each carcass ply is anchored to each bead region by turning up edges of each ply around a respective bead core at each bead region axially away from the equatorial plane to form four or more ply turn-ups.

According to yet another aspect of the pneumatic motorcycle tire, the tread has a width between 50 mm and 300 mm measured along a radially outer surface of the tread.

According to still another aspect of the pneumatic motorcycle tire, the overlay layer includes at least one fabric ply spirally wound axially across a radially outer region of the carcass plies.

According to yet another aspect of the pneumatic motorcycle tire, the radial thickness of the overlay layer is not less than 2.0 mm or not less than 0.8 mm.

According to still another aspect of the pneumatic motorcycle tire, the tread has a hardness at 300° C. of 40 to 60 Shore 'A' or 40 to 85 Shore 'A'.

DEFINITIONS

The following definitions are controlling for the disclosed invention.

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane EP of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Camber" means the ratio C/L between the radial distance C from the centre to the edge of the tire tread and the axial distance L between the centre and edge of the tread.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Gauge" refers generally to a measurement, and specifically to a thickness measurement.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

BRIEF DESCRIPTION OF THE DRAWINGS

FIG. 1 shows in cross-section a motorcycle tire in accordance with the present invention.

DETAILED DESCRIPTION OF EXAMPLES OF THE PRESENT INVENTION

The example motorcycle tire 1 of FIG. 1, in accordance with the present invention, comprises a pair of sidewalls 8, 9 terminating in bead regions 10, 11. Each bead region 10, 11 may be reinforced by an inextensible annular bead core 12, 13. Extending between each bead region 10, 11 may be a toroidal carcass structure with two or more carcass reinforcement plies 141, 142, which may be anchored in each bead region by being turned around the respective bead core 12, 13 laterally from the inside to the outside to form ply turn-ups 151, 152. The carcass reinforcement plies 141, 142 may comprise single plies of tire fabric laid with nylon cords. Each bead region 10, 11 may further comprise a hard rubber apex member 17, 18, which may be anchored to each respective bead core 12, 13 and may extend taperingly radially outwardly.

The fabric of the plies 141, 142 may also comprise polyester, rayon, glass, and/or aramid cords. One example fabric may have cords with a 3+2 polyester/glass construction. Further, the two plies 141, 142 may comprise cords crossed at opposite angles of 20° to 65° with respect to the equatorial plane EP of the example tire 1 (e.g., a bias construction). The example tire 1 may have a camber value between 0.5 and 0.7 or 0.45 to 0.85 and comprise a convex thread region 2 having two tread edges 3, 4, an overlay layer 5, and no breaker/belt layer between the overlay layer and the carcass structure. The tread width TW may be between 50 mm and 300 mm measured along the outer surface of the tread region 2.

The overlay 5 may comprise at least one fabric ply spirally wound axially across the radially outer region of the plies 141, 142. The at least one fabric ply may include cords oriented between −5° and +5° relative to the equatorial plane EP of the example tire 1. The cords may comprise polyester, rayon, glass, steel, and/or aramid cords. One example fabric may have cords with a 3+1 polyester/aramid construction.

Example compound properties of the tread region 2 may include a hardness value at 20° of between 40 to 85 Shore 'A' or at 100° C. of between 40 to 60 Shore 'A' and a tensile modulus at 25° C. and 300 percent extension of 3 MPa to 15 MPA or at 100° C. and 300 percent extension of less than 5 MPa. An example polymer may be emulsion or solution polymerised styrene butadiene (SBR) containing 10% to 50% styrene, or 20% to 50% styrene, or 25% to 45% styrene. A reinforcing filler may be either carbon black, silica, and/or a blend of both. The total amount of filler present may be from 15 parts to 160 parts by weight per hundred parts by weight of styrene-butadiene rubber. The filler may be present in an amount from 30 parts to 120 parts of the compound. Silica may be used in conjunction with a coupling agent, such as a silane coupling agent (e.g., bis 1,3-triethoxy-silyl propyl tetrasulphide). The silica may have a surface area of 60 $m^2/g$ to 300 $m^2/g$, or 80 $m^2/g$ to 250 $m^2/g$. The silica may be a precipitated silica. The coupling agent may be used in an amount from 2.0% to 18.5% by weight of silica filler, or 5% to 12% percent by weight of silica filler.

The carbon black may be a high surface area carbon black of SAF or ISAF type, having a surface area 80 $m^2/g$ to 300 $m^2/g$ and be present at 15 to 160 or 30 to 120 parts by weight per 100 parts by weight of styrene-butadiene rubber. The oil in the composition may be an aromatic or napthenic oil and may be present from 10 to 180 or 15 to 12 parts by weight per hundred rubber. The aromatic oil may have a specific gravity from 0.95-1.00. The compound may contain additives, such as accelerators, activators, extenders, and/or anti-degradants. A vulcanization agent may be sulphur or a sulphur-containing compound.

The example tire 1 may provide a bias construction combined with an overlay 5 (e.g., typically used with a breaker layer and radial construction), or hybrid construction, in accordance with the present invention. This hybrid construction may provide a motorcycle tire 1 with a greater stiffness than conventional radial motorcycle tires without the higher growth factors of conventional bias motorcycle tires. Further, the hybrid construction may require less carcass cord reinforcement than an equivalent sized radial motorcycle tire.

The above description is given in reference to example embodiments of a tire having a tread portion for reducing rolling resistance and increasing fuel economy. However, it is understood that many variations are apparent to one of ordinary skill in the art from a reading of the disclosure of the invention. Such variations and modifications apparent to those skilled in the art are within the scope and spirit of the instant invention, as defined by the following appended claims.

Further, variations in the present invention are possible in light of the descriptions of it provided herein. While certain representative example embodiments and details have been shown for the purpose of illustrating the subject invention, it will be apparent to those skilled in this art that various changes and modifications can be made therein without departing from the scope of the subject invention. It is, therefore, to be understood that changes may be made in the particular example embodiments described which will be within the fully intended scope of the invention as defined by the following appended claims.

What is claimed:

1. A pneumatic tire comprising:
   a tread rotatable about an axis and intended for contacting a road surface, the tread further having an equatorial plane intersecting the axis at 90°;
   two circumferentially extending annular bead regions;
   a carcass structure extending between the tread and the bead regions, the carcass structure supporting the tread about the axis, the carcass structure comprising two carcass plies having reinforcing cords oriented to cross at opposite angles of 20° to 65° with respect to the equatorial plane; and
   an overlay ply extending circumferentially and extending radially between the carcass structure and the tread, the overlay ply comprising cords oriented between −5° and +5° relative to the equatorial plane, the tread having a camber of 0.6, the reinforcing cords of the carcass plies have a 3+2 polyester/glass construction and the cords of the overlay ply have a 3+1 polyester/aramid construction.

2. The pneumatic tire as set forth in claim 1 wherein each carcass ply is anchored to each bead region by turning up edges of each ply around a respective bead core at each bead region axially away from the equatorial plane to form four ply turn-ups.

3. A pneumatic motorcycle tire comprising:
   a tread rotatable about an axis and intended for contacting a road surface, the tread further having an equatorial plane intersecting the axis at 90°;
   two circumferentially extending annular bead regions;
   a carcass structure extending between the tread and the bead regions, the carcass structure supporting the tread about the axis, the carcass structure comprising two carcass plies having reinforcing cords oriented to cross at opposite angles of 20° to 65° with respect to the equatorial plane; and
   an overlay layer extending circumferentially and extending radially between the carcass structure and the tread, the overlay layer comprising cords oriented between −5° and +5° relative to the equatorial plane, the tread having a camber of 0.6, the reinforcing cords of the carcass plies have a 3+2 polyester/glass construction and the cords of the overlay layer have a 3+1 polyester/aramid construction.

4. The pneumatic motorcycle tire of claim 3 wherein each carcass ply is anchored to each bead region by turning up edges of each ply around a respective bead core at each bead region axially away from the equatorial plane to form four ply turn-ups.

5. The pneumatic motorcycle tire of claim 3 wherein the tread has a width between 50 mm and 300 mm measured along an outer surface of the tread.

6. The pneumatic motorcycle tire of claim 3 wherein the overlay layer comprises at least one fabric ply spirally wound axially across a radially outer region of the carcass plies.

7. The pneumatic motorcycle tire of claim 3 wherein the radial thickness of the overlay layer is not less than 0.8 mm.

8. The pneumatic motorcycle tire of claim 3 wherein the tread has a hardness at 25° C. of 40 to 85 Shore 'A'.

* * * * *